Sept. 22, 1964                F. DE BUIGNE                3,149,722
METHOD AND APPARATUS FOR COORDINATING MEASURING OPERATIONS
Original Filed March 31, 1958                    14 Sheets-Sheet 2
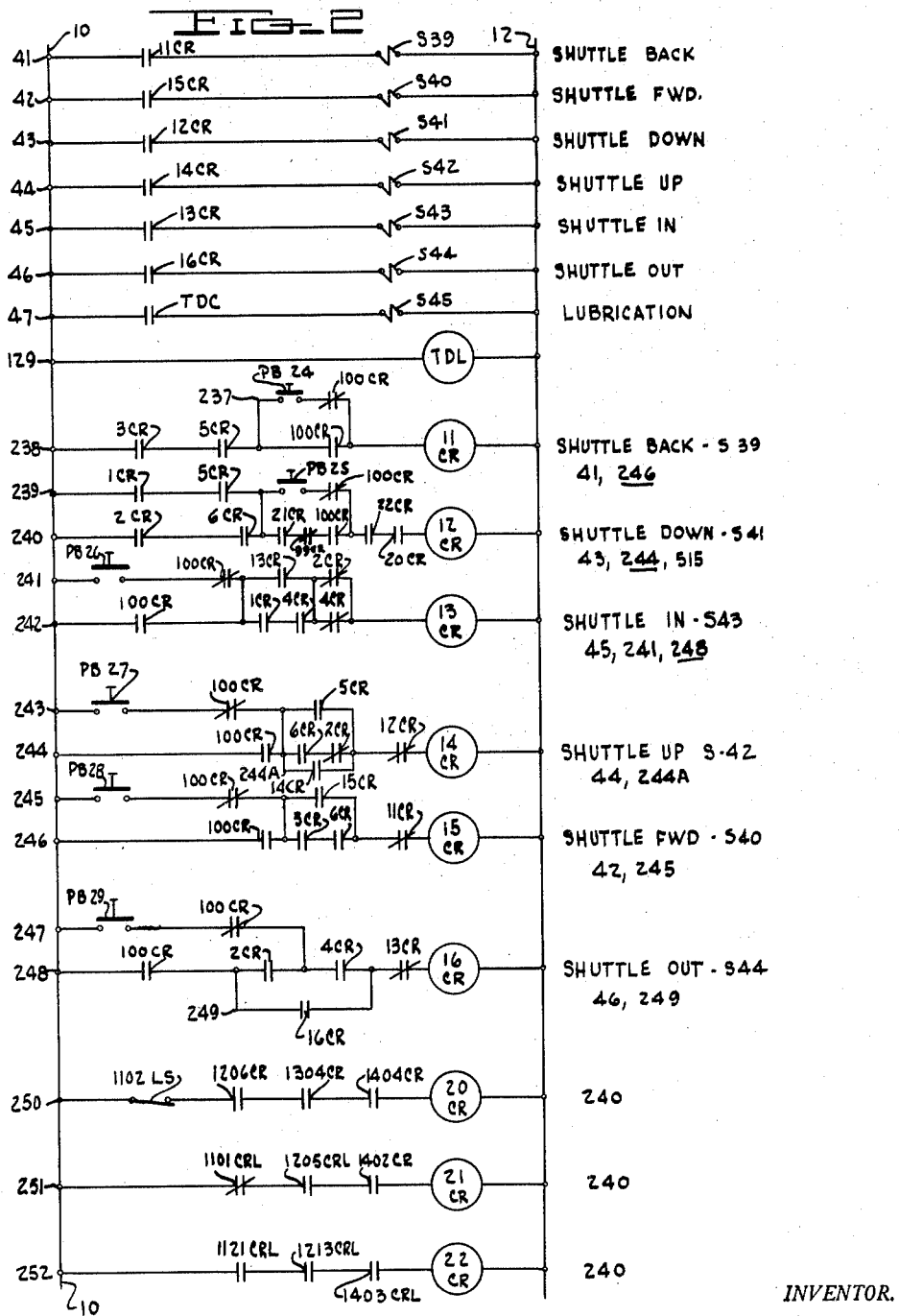
INVENTOR.
FRANK DE BUIGNE
BY Sept. 22, 1964  F. DE BUIGNE  3,149,722
METHOD AND APPARATUS FOR COORDINATING MEASURING OPERATIONS
Original Filed March 31, 1958  14 Sheets-Sheet 3
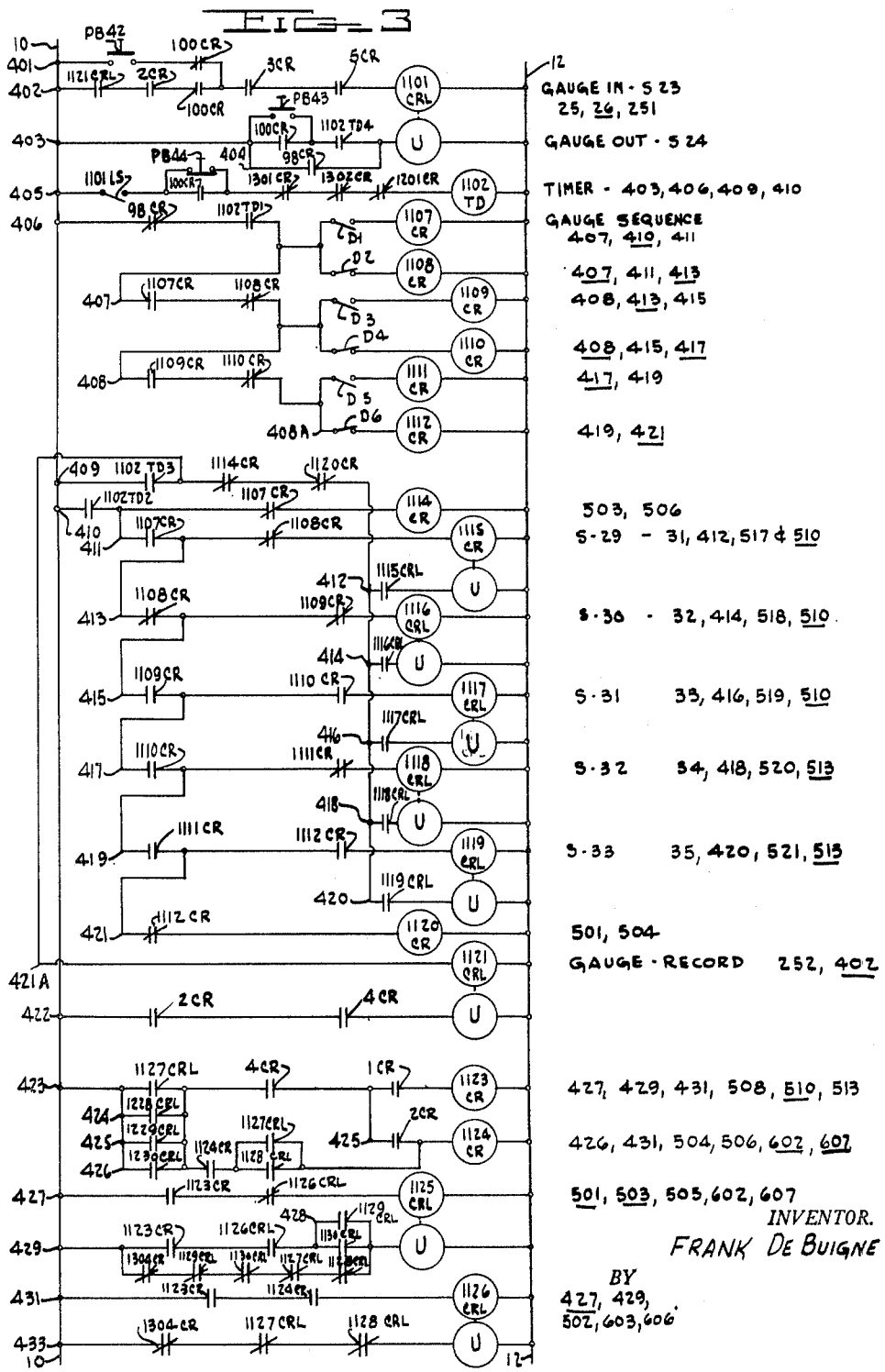
INVENTOR.
FRANK DE BUIGNE

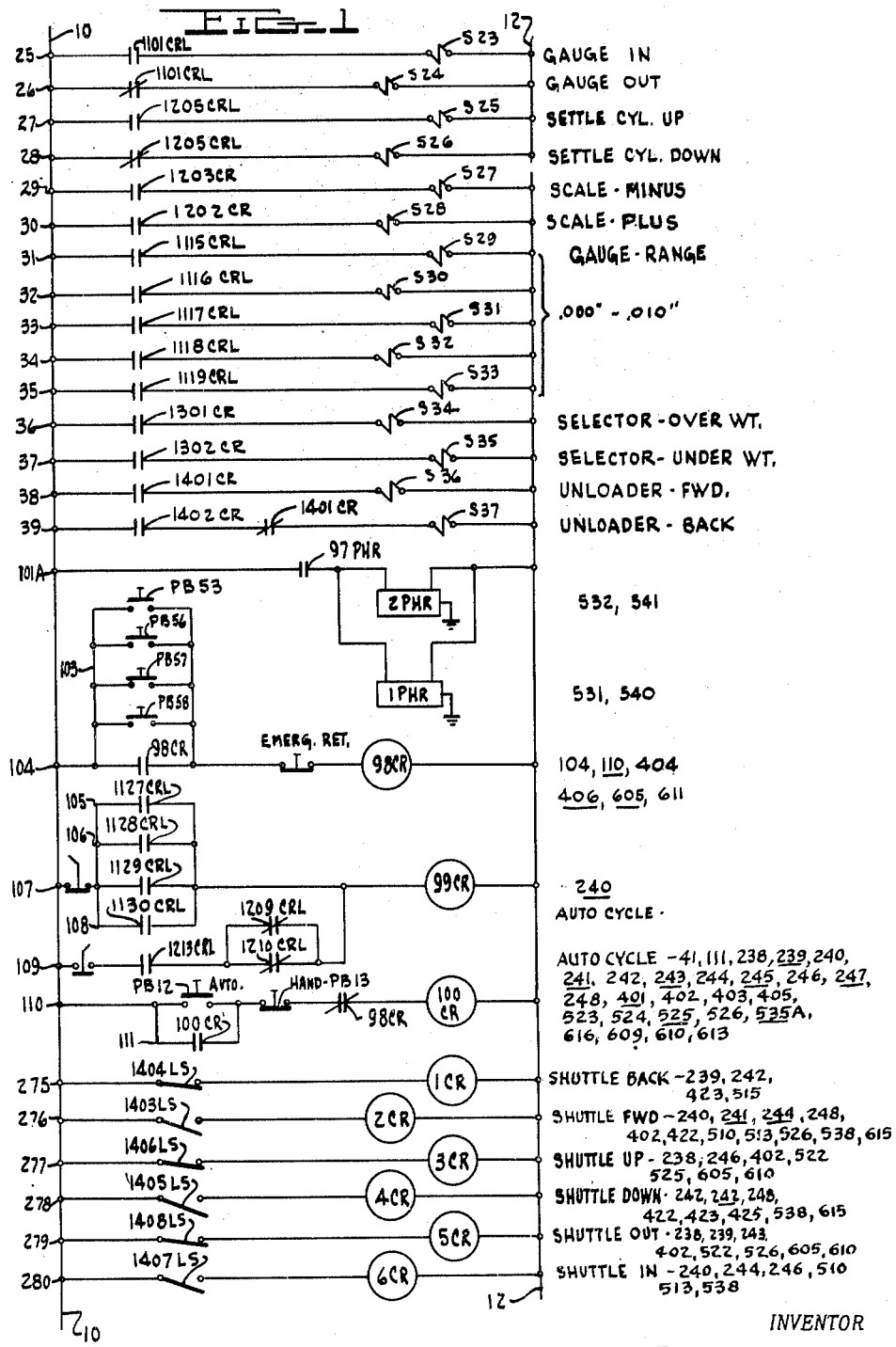

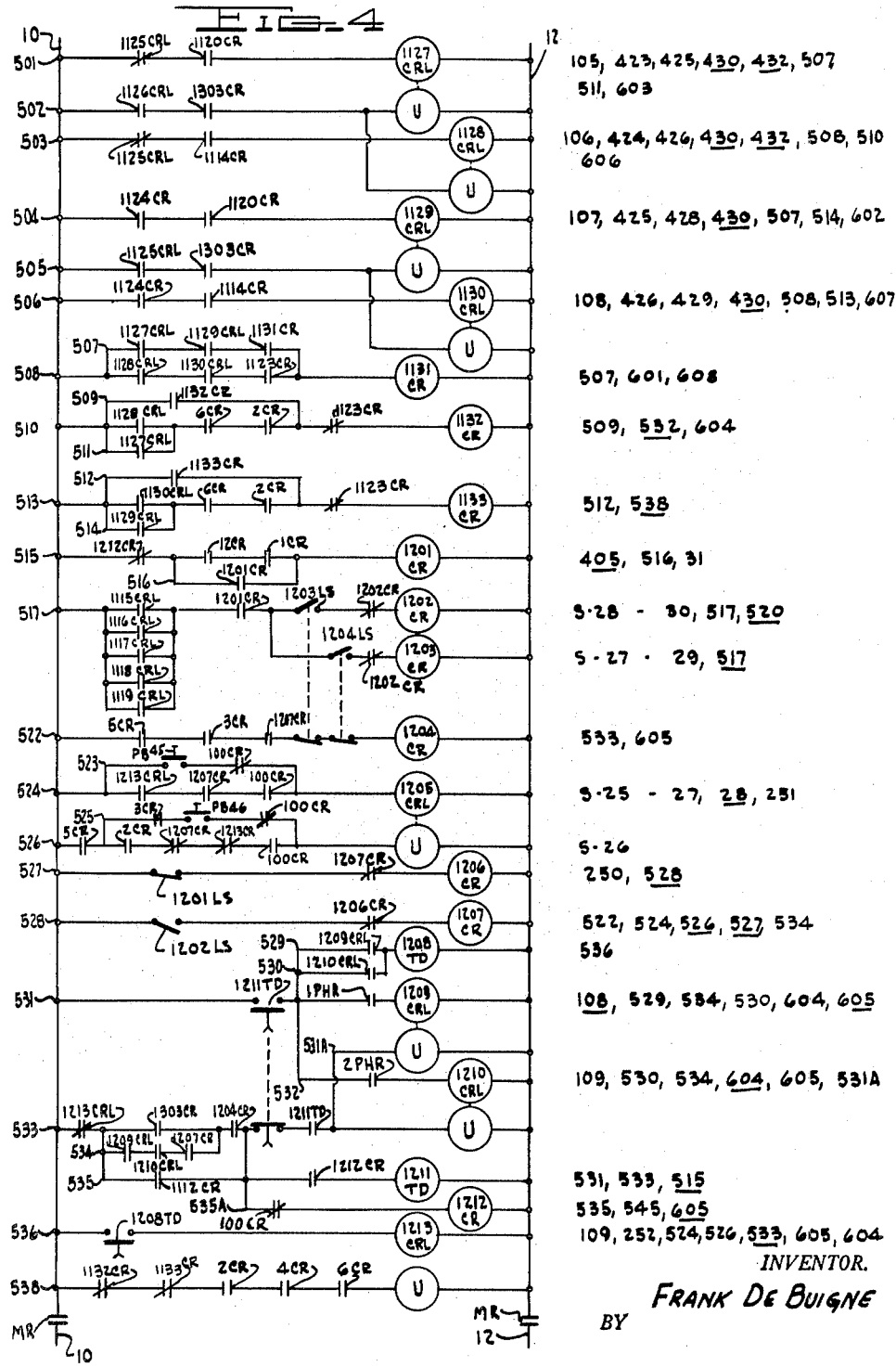

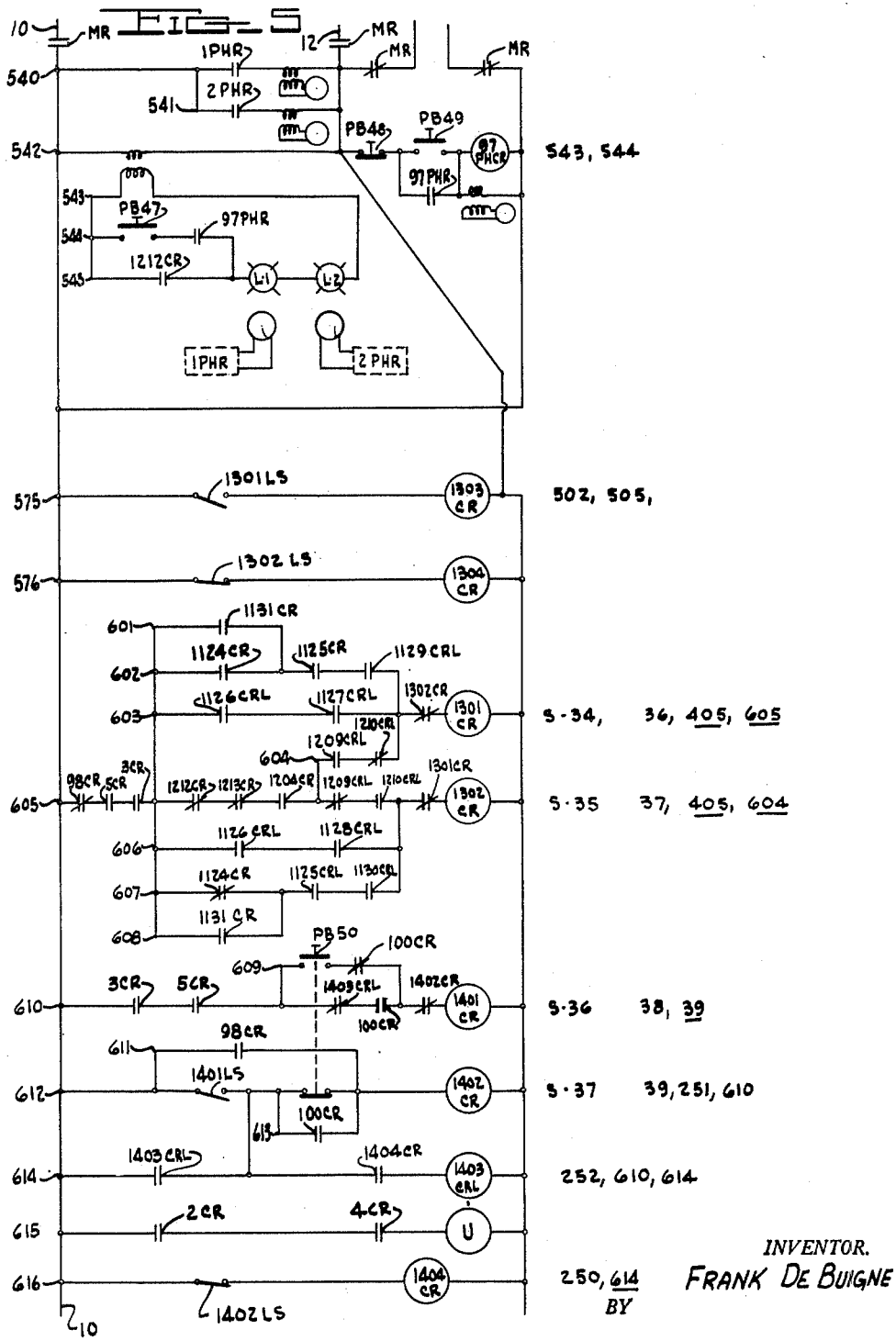

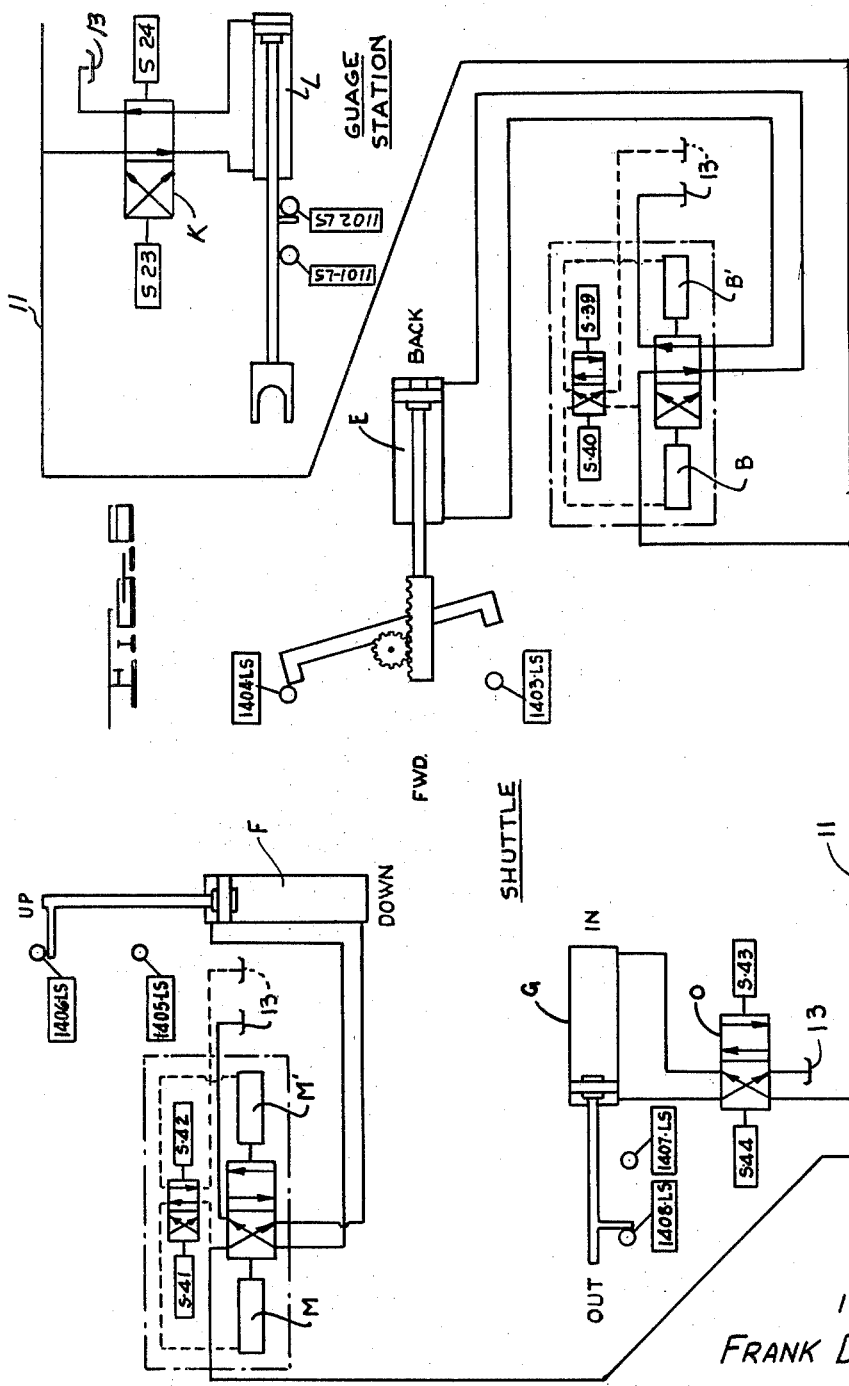

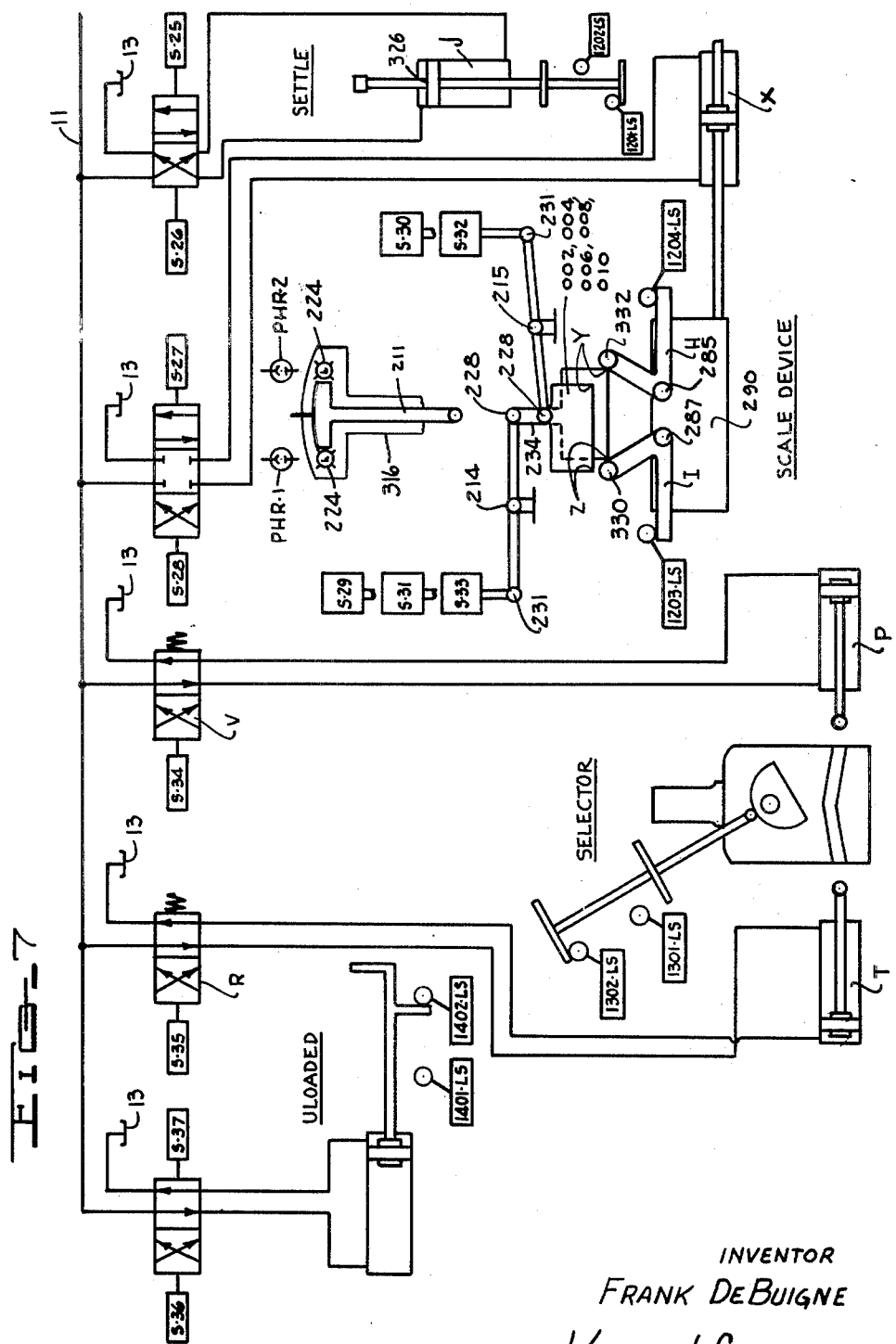

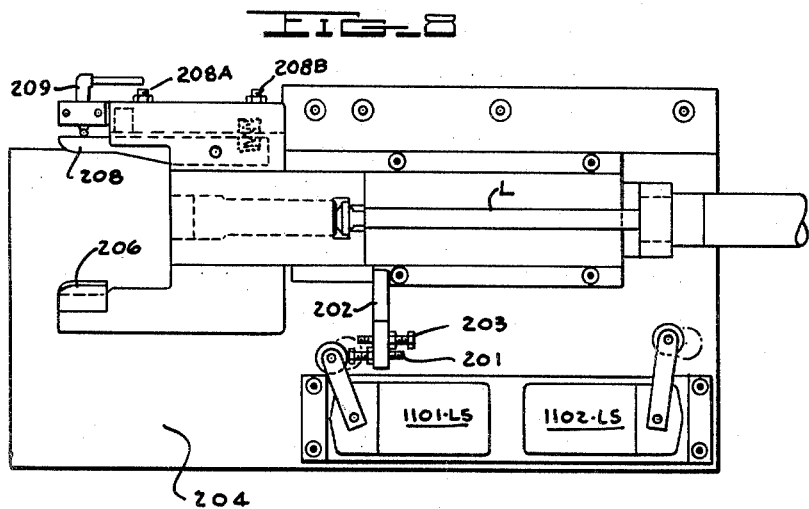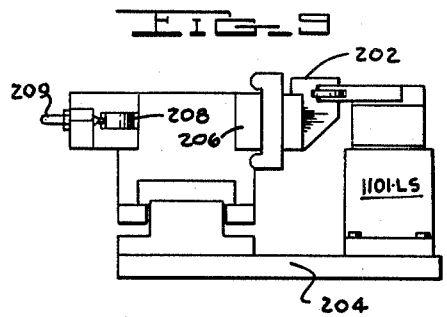

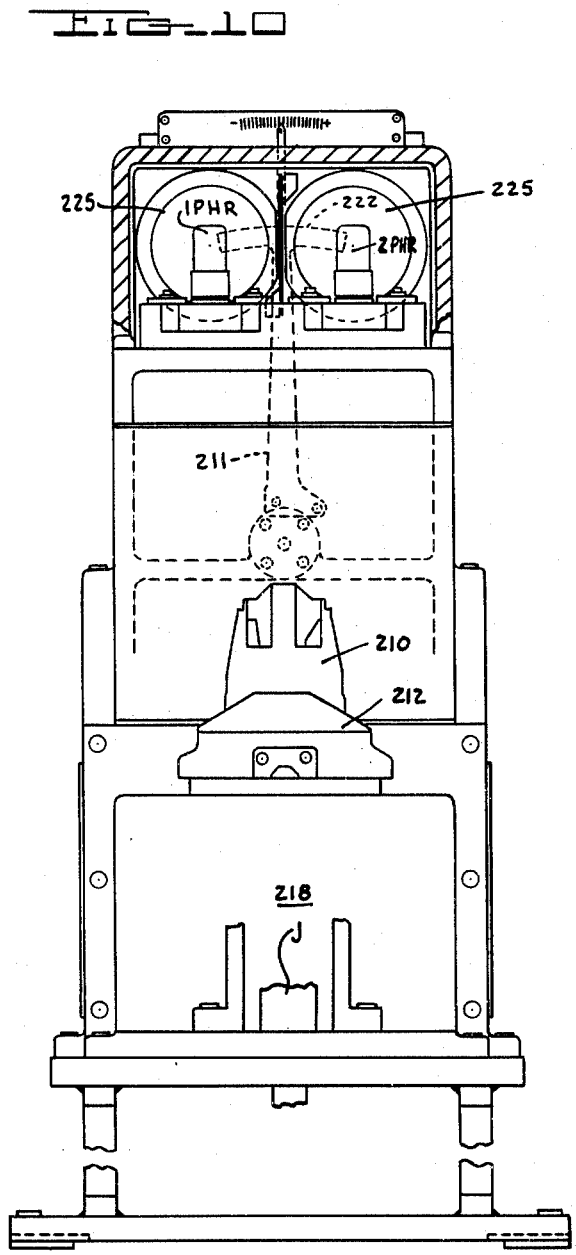

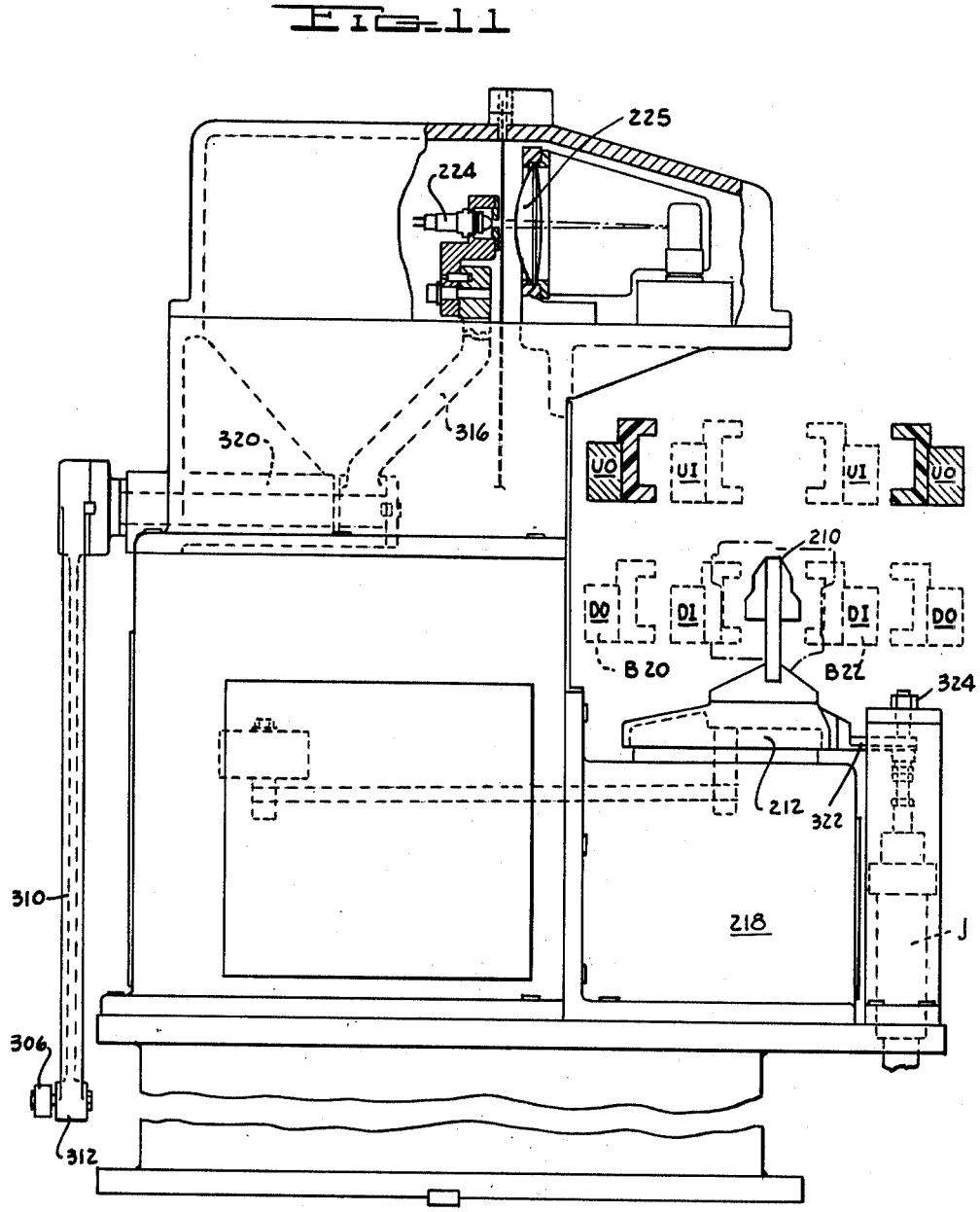

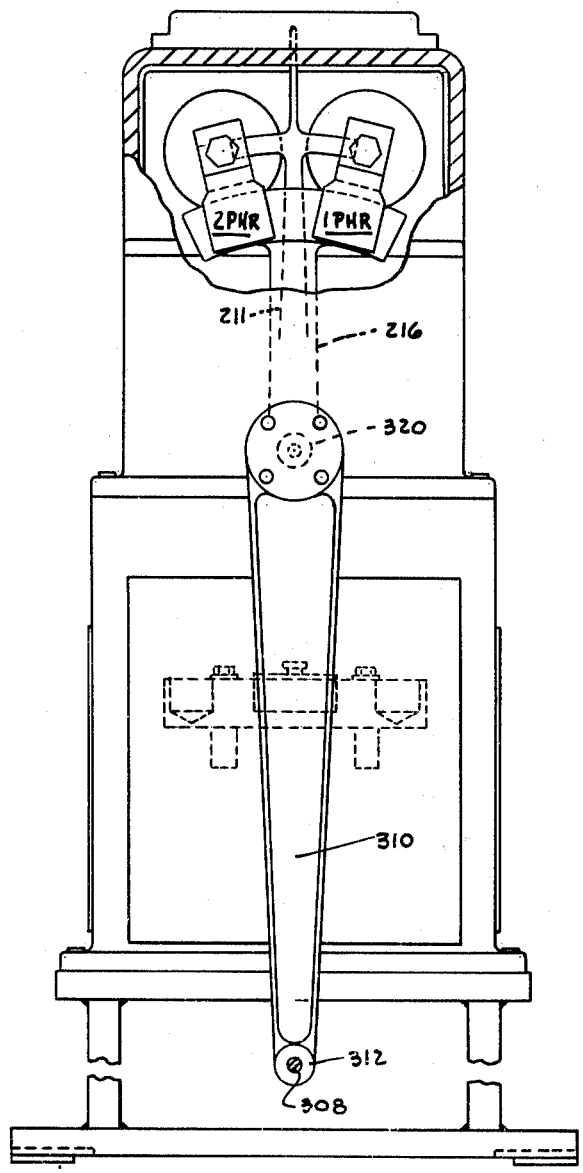

Sept. 22, 1964  F. DE BUIGNE  3,149,722
METHOD AND APPARATUS FOR COORDINATING MEASURING OPERATIONS
Original Filed March 31, 1958  14 Sheets-Sheet 12
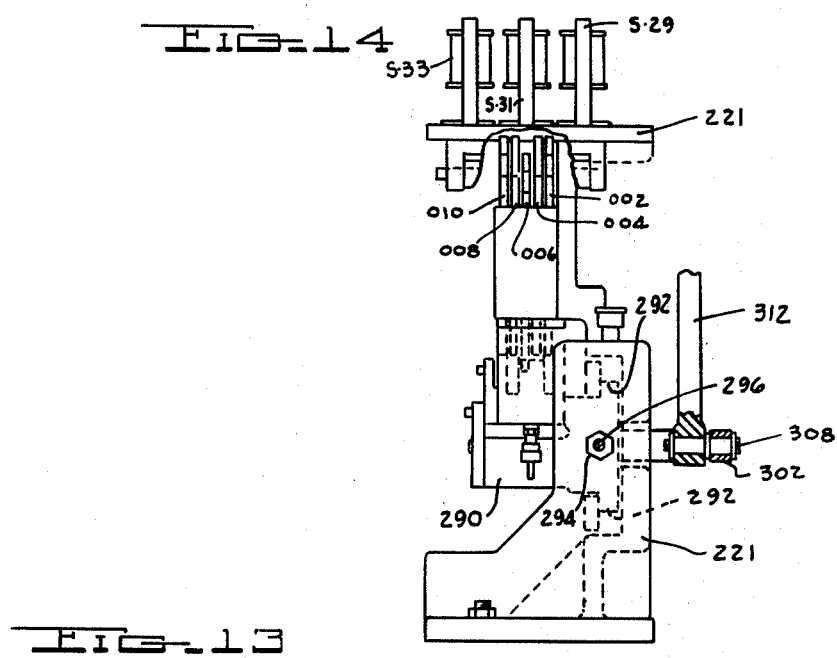
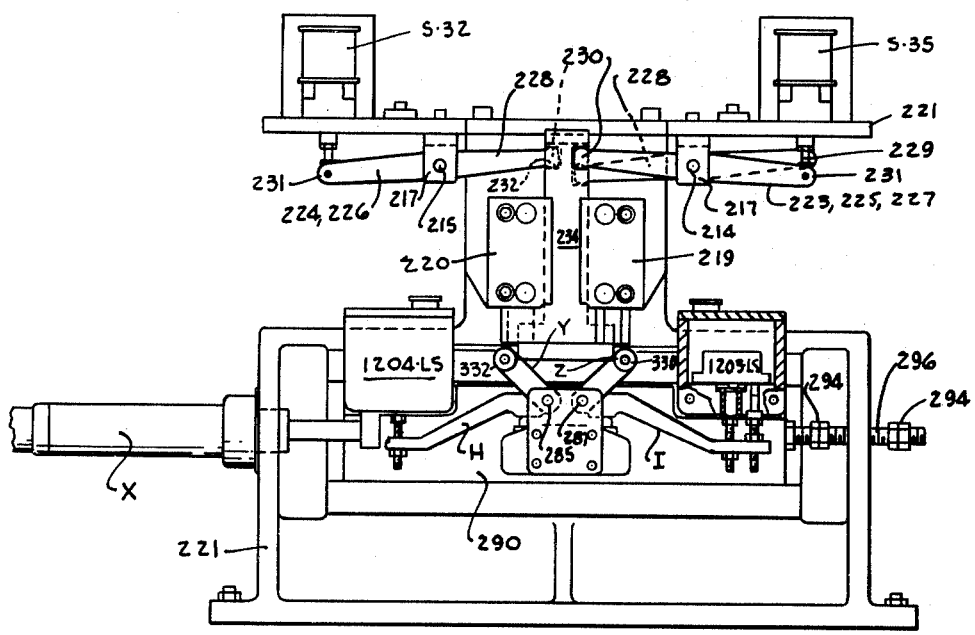
INVENTOR
FRANK DE BUIGNE
KOTTS & SHERIDAN
ATTORNEYS

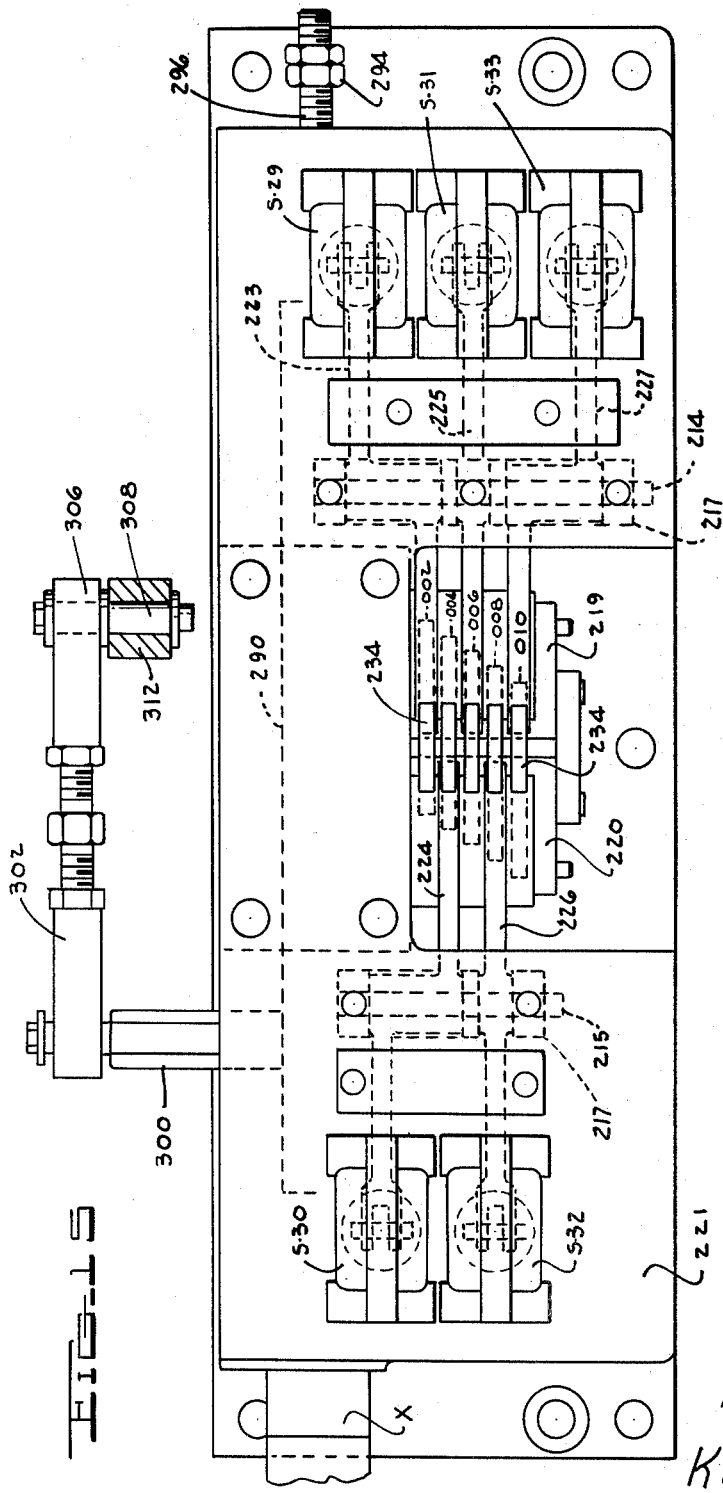

Sept. 22, 1964  F. DE BUIGNE  3,149,722
METHOD AND APPARATUS FOR COORDINATING MEASURING OPERATIONS
Original Filed March 31, 1958  14 Sheets-Sheet 14
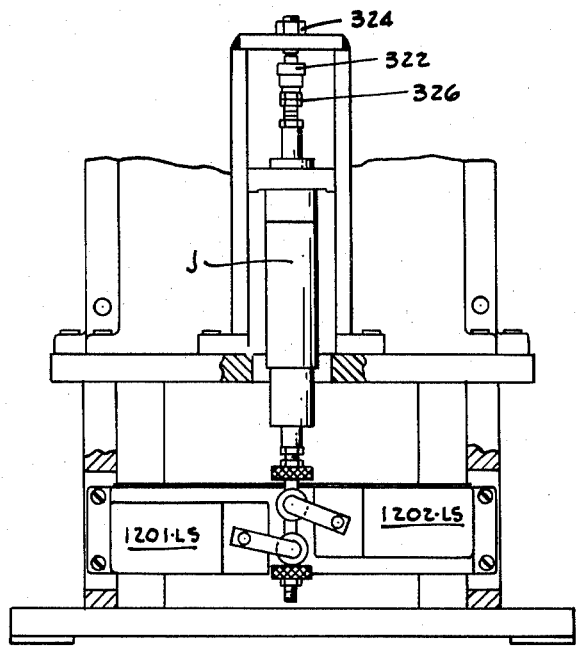
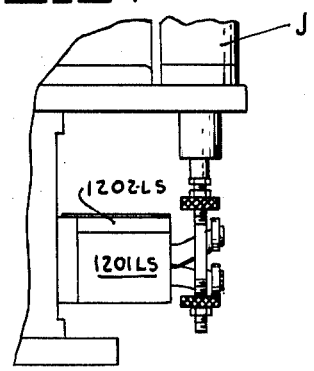
INVENTOR
FRANK DE BUIGNE
KOTTS & SHERIDAN
ATTORNEYS

United States Patent Office 3,149,722
Patented Sept. 22, 1964

3,149,722
METHOD AND APPARATUS FOR COORDINATING MEASURING OPERATIONS
Frank De Buigne, Birmingham, Mich., assignor to La Salle Machine Tool, Inc., Detroit, Mich.
Continuation of application Ser. No. 725,087, Mar. 31, 1958. This application Mar. 28, 1962, Ser. No. 193,347
13 Claims. (Cl. 209—75)

This application is a continuation of my co-pending application Serial Number 725,087, filed March 31, 1958, and relates to new and useful improvements in automation equipment and more particularly to an improved method for expediting the gauging, weighing and selection of precision automobile pistons in several simultaneous steps.

In the manufacture of precision automobile pistons it is necessary to very accurately control the dimensional size and weight tolerance of each piston fabricated. It is necessary therefore, to gauge, weigh and select meticulously each piston which is manufactured.

It is therefore a principal object of the present invention to provide a new and more accurate method of rapidly gauging, weighing and selecting precision automobile pistons which incorporates maximum production efficiency and minimum material and time waste.

Another object of the invention is the provision of a gauging device which will automatically record and establish a program for a weighing device at a successive work station, with the weighing device establishing and controlling the weight tolerance of any given automobile piston with respect to its gauged size.

Still another object of this invention will be provision of a gauging and weighing device which will automatically reject any piston which does not fall within a pre-determined critical size or weight tolerance.

Another object of the present invention is the provision of an apparatus which will provide a highly efficient method of manufacturing precision automobile pistons which have a pre-determined diametral size and weight tolerance, with the apparatus being of relatively simple construction and design.

Still another object of the present invention is the provision of an automation machine, wherein a group of independent elements comprise the complete machine to carry out the entire manufacturing process, while any of various elements could be used separately as independent inspection devices.

The foregoing and related objects can be accomplished by the provision of a shuttle device which will operate to automatically engage and transfer independent pistons, one located at each of several work stations; move each of said pistons vertically up, horizontally forward and then vertically down in timed sequence, thereby advancing the piston to the next work station and depositing same thereon, with the shuttle expanding to release said piston and then returning to the original starting position, ready for another cycle; at the several work stations, the independent pistons are gauged at one station, weighed at another and accepted or rejected at still another, each step of the operation being completed simultaneously; and an electric control circuit means cooperable with said shuttle device for selectively reciprocating said shuttle device in the pre-determined cycle.

Other objects of this invention will appear in the following description and appended claims, reference being had to the accompanying drawings forming a part of this specification, wherein like reference characters designate corresponding parts in the several views.

In the drawings:

FIGURES 1–5 are fragmentary schematic views, which when joined comprise the complete control means for the electric circuit.

FIGURES 6 and 7 are fragmentary schematic views which when joined comprise the complete hydraulic control means.

FIGURE 8 is a plan view of the air gauge used in the present invention.

FIGURE 9 is an end elevation of the air gauge shown in FIGURE 8.

FIGURE 10 is a front elevation view of the scale device.

FIGURE 11 is a side view of the scales shown in FIGURE 10, partly broken away for clarity.

FIGURE 12 is a rear elevation of the scale device shown in FIGURE 10.

FIGURE 13 is a front elevation view of the scale compensator.

FIGURE 14 is a side view of the scale compensator shown in FIGURE 13.

FIGURE 15 is a plan view of the scale compensator shown in FIGURE 13.

FIGURE 16 is a view of the settle cylinder and control means.

FIGURE 17 is a partial side view of the settle cylinder controls shown in FIGURE 16.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

As previously stated, the present mechanism is used in connection with the manufacture of precision automobile pistons, wherein the complete manufacturing operation is carried out automatically in a single machine. The automobile piston being worked on is carried by a hydraulically actuated reciprocating shuttle mechanism, the complete mechanism being illustrated in my Patent Number 2,818,963, filed October 14, 1957. The shuttle mechanism advances the piston, (1) first to the gauge station, where an automatic gauging operation takes place. During the gauging operation, several electrical controls are energized, as well as several hydraulic cylinders. This in turn establishes a program for the scale device located at the next successive work station.

The shuttle bars are again activated to advance the piston to the (2) weighing station. To accomplish this, the shuttle bars move (from the starting position of back, up and out) (A) vertically down, (B) then in toward each other to engage the piston, (C) vertically up, with the piston, (D) horizontally forward to a position above the next work station, (E) then vertically down to deposit the piston when the shuttle bars (F) move out, (G) vertically up, and (H) horizontally back to the original start position, ready for another cycle. The program for the weighing station having been established during the gauging operation.

After the piston has been weighed, the shuttle bars are again activated and move vertically down and then toward each other to clamp the piston therebetween. The shuttle bars then are moved vertically upward with the piston, and then horizontally forward to a position above (3) the selector station, where an electrical memory circuit operates an arm to either accept or reject the piston.

Each piston is kept under constant control during each step of the work cycle, the several operations being synchronized by an electrical system made up of limit switches, relays, relay contacts and solenoids, which are energized in accordance with the position of the shuttle bars, hydraulic cylinders and the weight and size of each of the various pistons handled during the work cycle.

In order that a complete understanding of the mechanism involved may be readily understood, the schematic diagram of the electrical system and hydraulic system will be described first. Circuit lines 10 and 12 are common to all figures of the electrical schematic diagram and provide the source of power for the operation of the entire machine. Hydraulic line 11 is common to each of the schematic portions of the hydraulic system and it provides the hydraulic fluid for operation of the complete fluid system. Discharge hydraulic fluid empties into a common reservoir or sump 13.

Referring to the drawings:

It will be noted that in each respective line of the circuit diagram, all contacts energized or deenergized, as the case may be, is indicated on the right side of the drawing, for example: In line 104, when CR–98 is energized, contacts in lines 104, 110, 404, 406, 605 and 611 are energized. Throughout the drawings (FIGURES 1–5), the relay contacts which are normally closed are underlined for easier recognition, the other relay contacts are normally open.

When limit switch 1404LS in line 275 is held closed, along with limit switch 1406LS in line 277 and limit switch 1408LS in line 279, as shown in FIGURE 1 of the drawings, control relays 1CR, 3CR, 5CR, 11CR and 14CR are energized, as are solenoids S39 and S42. This positions the shuttle bars in the start position.

(For purposes of clarity and understanding, at the end of each of the shuttle movements, the circuits which have been opened and closed will be identified. In certain instances, although the circuit is de-energized, it will appear that the circuit should be energized to obtain the motion desired. For this reason, it must be understood that when any of the solenoids S39 through S44 are energized, the valve which it controls will be positioned and will stay in that position until the valve is re-positioned through the action of the solenoid adjacent thereto.)

*Shuttle, Back, Up and Out (Start Position)*

When the automatic cycle push button PB–12, located in line 110 of FIGURE 1 is closed, control relay 100CR is caused to be energized, closing relay contacts 100CR in lines 41, 111, 238, 240, 242, 244, 246 and 248 in FIGURE 2, 402, 403 and 405 in FIGURE 3, 523, 524 and 526 in FIGURE 4 and 609, 610 and 613 and 616 in FIGURE 5, while the normally closed relay contacts 100CR in line 36, FIGURE 1, 239, 241, 243, 245 and 247 in FIGURE 2, 401 in FIGURE 3 and 525 in FIGURE 4 are opened. Limit switch 1404LS is held closed energizing control relay 1CR. Relay contacts 1CR in lines 239 and 242 in FIGURE 2, 423 in FIGURE 3 and 515 in FIGURE 4 are closed. Limit switch 1406LS is held closed energizing control relay 3CR. Relay contacts 3CR in lines 238 and 246 in FIGURE 2, 402 in FIGURE 3, 522 and 525 in FIGURE 4 and 605 and 610 in FIGURE 5 are also closed. In addition, limit switch 1408LS is held closed and control relay 5CR is energized. Relay contacts 5CR in lines 238, 239 and 243 in FIGURE 2, 402 in FIGURE 3 and 526, 605 and 610 in FIGURES 4 and 5 are closed. Thus, the circuits in lines 238 and 244 are closed, energizing control relays 11CR and 14CR. With these circuits complete, relay contact 11CR in line 41 energizes solenoid S39 and opens the normally closed relay contact 11CR in line 246. Relay contact 14CR in line 44 is closed energizing solenoid S42, while relay contact 14CR in line 244A closes. Hydraulic shuttle cylinders E, F and G are now positioned as follows: piston E is back, limit switch 1404LS closed, piston F is up, limit switch 1406LS closed, and piston G is out, limit switch 1408LS is closed. Hydraulic gauge cylinder piston L is back, limit switch 1102LS closed, maintaining the gauges out. The settle cylinder piston J is up, with limit switch 1201LS closed, scale device mid-position with limit switches 1203LS and 1204LS open, selector back, limit switch 1302LS closed, the unloader out, limit switch 1402LS closed.

(Circuits Closed—
1CR, 275–3CR, 277–5CR, 279–11CR, 238–14CR, 244)

*Shuttle, Back, Down, and Out*

As the cycle continues, limit switch 1406LS opens to de-energize control relays 3CR in line 275, 11CR in line 238 and 14CR in line 244. When this occurs, control relay 12CR in line 240 is energized and relay contact 12CR in line 43 energizes solenoid S41. The circuit in line 238 is complete through relay contacts 1CR, and 5CR, then through line 240 with relay contacts 21CR, 100CR, 20CR and 22CR. Solenoid S41 in line 43 is energized, while relay contacts 12CR in line 515 closes and 12CR in line 244 opens, thereby de-energizing control relay 14CR. Gauge limit switch 1102LS in line 250 is held closed, settle cylinder J limit switch 1201LS (FIGURE 7) and in line 527 of FIGURE 4 is held closed, energizing control relay 1206CR in line 527 and closes relay contacts 1206CR in line 250, opening relay contact 1206CR in line 528. In line 526, selector limit switch 1302LS is held closed, energizing control relay 1304CR and operation relay contacts 1304CR in line 250. Unloader limit switch 1402LS is held closed, energizing control relay 1404CR in line 616 to close relay contacts 1404CR in lines 250 and 614, energizing control relay 20CR. Latch control relay 1205CRL in line 524 is closed, energizing solenoid S25 in line 27, opening contact 1205CRL in line 28, closing contact 1205CRL in line 251. Previous closing of contact 1403CRL in line 614 operates to close control relay 1402CR in line 612, energizing solenoid S37 in line 39, closing relay contacts 1402CR in lines 251 and 610 respectively and thus energize control relay 21CR. The circuit through line 252 is closed through latch control relays 1121CRL and 1213CRL in lines 421A and 536 and are energized with the closing of time delay contact 1102TD3 in line 421A and time delay relay 1208TD in line 536, thereby energizing control relay 22CR. As solenoid S41 is energized, hydraulic valve M in FIGURE 6 is activated to permit cylinder piston F to move the shuttle down. This causes limit switch 1406LS in line 277 of FIGURE 1 to open, de-energizing control relays 3CR, 11CR in line 238 and 14CR in line 245, opening relay contacts 3CR in lines 238, 246 in FIGURE 2, 402 in FIGURE 3, 522 and 525 in FIGURE 4 and 605 and 610 in FIGURE 5. Control relay 14CR in line 244 being de-energized with the opening of relay contact 12CR therein. When cylinder piston F reaches the limit of downward travel, limit switch 1405LS in line 278 closes energizing control relay 4CR. The circuit closed, relay contacts 4CR in lines 242, 248 of FIGURE 2, 422, 423 and 425 in FIGURE 3, 538 in FIGURE 4 and 615 in FIGURE 5 are all actuated.

(Circuits Closed—
   1CR, 275–4CR, 278–5CR, 279–12CR, 240)
(De-Energized—3CR, 277–11CR, 238–14CR, 244)

Shuttle, Back, Down and In

With the circuit in lines 278, 279 and 280 complete and relays 1CR, 4CR and 6CR energized, the circuit in line 242 is complete and control relay 13CR is energized. This energizes solenoid S43 in line 45 to operate hydraulic valve C and retract shuttle piston G. As the shuttle piston G moves down, limit switch 1408LS in line 279 opens, de-energizing control relay 5CR. This in turn opens relay contact 5CR in line 239 to de-energize control relay 12CR in line 240. When shuttle piston G reaches the bottom of the stroke, limit switch 1407LS in line 280 is held closed and relay 6CR is energized. Relay contact 5CR in line 239 opens to de-energize control relay 12CR in line 240.

(Circuits Closed—
   1CR, 275–4CR, 278–6CR, 280–13CR, 245)
(De-Energized—5CR, 279–12CR, 240)

Shuttle, Back, Up and In

The circuit is now complete in line 244 to energize control relay 14CR, closing the circuit in line 244A and 45, thereafter energizing solenoid S42. When solenoid S42 in line 45 is energized, hydraulic valve M is activated and shuttle piston F moves up. This opens limit switch 1405LS in line 278, de-energizing control relay 4CR and 13CR in line 242. At the end of the stroke, limit switch 1406LS is held closed, thereby energizing control relay 3CR in line 277.

(Circuits Closed—
   1CR, 275–3CR, 277–6CR, 280–14CR, 244)
(De-Energized—4CR, 278–13CR, 242)

Shuttle, Forward, Up and In

The circuit in line 246 is now complete, control relays 3CR and 6CR having been previously activated, solenoid S40 in line 42 is energized. When solenoid S40 is energized, hydraulic valve B is activated and shuttle piston E causes the shuttle to move forward. Limit switch 1404LS in line 275 opens, de-energizing control relays 1CR and 14CR in line 244. At the end of the stroke, limit switch 1403LS in line 276 closes, energizing control relay 2CR. Limit switches 1406LS and 1407LS remaining closed, thereby maintaining control relays 3CR and 6CR in lines 277 and 280 energized. This closes the circuit in lines 244 and 246 to energize control relay 15CR and solenoid S40 in line 42.

(Circuits Closed—
   2CR, 276–3CR, 277–6CR, 280–15CR, 246)
(De-Energized—1CR, 275–14CR, 244)

Shuttle, In, Forward and Down

The circuit is complete in line 240 in the manner previously described in connection with the shuttle back, down and out. Control relay 12CR having been energized, control relay contact 12CR in line 244 opens, de-energizing control relay 14CR. Solenoid S41 is again energized in line 43, causing limit switch 1406LS in line 277 to open, de-energizing control relay 3CR as the shuttle piston F moves down. At the bottom of the stroke, limit switch 1405LS is closed, energizing control relay 4CR in line 278. Control relays 13CR and 15CR now de-energized have previously positioned pistons E and G.

(Circuits Closed—
   2CR, 276–4CR, 278–6CR, 280–12CR, 240)
(De-Energized—3CR, 278–15CR, 246)

Shuttle, Forward, Down and Out

The circuit is now complete in line 248, relay contacts 2CR and 4CR being closed and control relay 16CR is energized. This closes the circuit in line 46 energizing solenoid S44. This solenoid operates hydraulic valve O which causes shuttle piston G to move out, opening limit switch 1407LS in line 280. This de-energizes control relay 6CR and its respective relay contacts. When shuttle piston G is fully out, limit switch 1408LS in line 279 is closed and control relay 5CR is energized. Control relays 12CR and 15CR having been previously energized, maintain hydraulic cylinders E and F forward and down.

(Circuits Closed—
   2CR, 276–4CR, 278–5CR, 279–16CR, 248)
(De-Energized—6CR, 280–12CR–246)

Shuttle, Out, Up and Forward

The circuit is now complete in lines 243 and 244 to energize control relay 14CR, thereby opening limit switch 1405LS in line 278 and de-energizing control relay 4CR and closing limit switch 1406LS to energize control relay 3CR. Relay 14CR energizes solenoid S42 to operate hydraulic valve M and cylinder piston F which moves the shuttle up and down.

Circuits Closed—
   2CR, 276–3CR, 277–5CR, 279–14CR, 244)
(De-Energized—4CR, 278–16CR, 248)

De-energization of control relays 2CR, 276, 14CR, 244, 15CR, 246, 16CR, 248 and energization of relay contacts 3CR and 5CR in line 238, through the closing of same now energizes control relay 11CR and the shuttle returns to the start position. Thus, the shuttle starts from the back, up and out position and moves first down, then in, up, forward, down, out, up then in and back to the original position.

As previously mentioned, the circuits opened and closed during each of the shuttle movements is outlined at the bottom of each paragraph. This readily illustrates the circuits operated to obtain and maintain the proper positioning of the respective components and hydraulic valves.

Gauge Station

With limit switch 1403LS in line 276 and limit switch 1406LS in line 277 and limit switch 1408LS in line 279 closed, control relays 2CR, 3CR and 5CR are energized and the circuit in line 402 energizes latch control relay 1101CRL. This in turn closes relay contact 1101CRL in line 25 to energize solenoid S23, which in turn actuates gauge hydraulic valve K (FIGURE 6). This causes hydraulic cylinder piston L (FIGURES 6 and 8) to move forward with an air gauge. The air gauge and its mechanical operation is more fully described in connection with FIGURE 8 of the drawings. The forward movement of hydraulic cylinder piston L opens limit switch 1102LS in line 250 and closes limit switch 1101LS in line 405. The normally closed relay contact 1101CRL in line 26 is now open and solenoid S24 is de-energized as is relay contact 1101CRL in line 251.

The latch control relays are mechanically latched to hold their respective contacts in either their open or closed position, thereby providing a safety factor in the event of a power failure, since no interruption of the machine function will occur.

When the limit switch 1101LS in line 405 is closed, the multiflex timer 1102TD in the same line is energized. However, if the control relay 1201CR in line 515, which indicates and adjusts the scale program is not properly set for the part on the scale platform, the relay contact 1201CR in line 405 will open and the timer will not start. Should control relay 1301CR in line 604 or control relay 1302CR in line 605 not have been de-energized, the system likewise will not function. As limit switch 1101LS in line 405 is closed, the multiflex timer 1102TD is energized. This closes the normally open relay contacts 1102TD in lines 403, 406, 409 and 410. Relay contacts 1102TD1 in line 406 closes one-half second after the closing of time delay 1102TD in line 405 and remains closed for two and one-half seconds. When this occurs, control relays 1107CR through 1112CR may be energized, depending on the gauged diameter of the piston.

Before the gauge measurement of the piston is made, the time delay device permits the air gauge to settle, thereby eliminating any possibility of error. Assuming that the piston is within permissible limits, neither undersize or oversize, but .009 larger than the minimum permissible gauge tolerance, control relay 1107CR in line 406 will be energized. As the piston contacts the air gauge, switch D1 is closed, which in turn closes the relay contacts 1107CR in lines 407 and 411, while opening relay contacts 1107CR in line 410. The first stage circuit is now complete. In the second stage, air gauge switch D2 opens and control relay 1108 in line 460A is de-energized. Relay contacts 1108CR in lines 407 and 413 remain closed, while the normally open relay contact 1108CR in line 411 remains open. In the third stage, control relay 1109CR is energized with the closing of air gauge switch D3, which in turn closes the normally open relay contacts 1109CR in lines 408 and 415, while the normally closed relay contact 1109CR in line 413 opens. In the fourth stage, air gauge switch D4 opens and control relay 1110CR in line 407A is de-energized. The normally closed relay contacts 1110CR in lines 408 and 417 remain closed, while the normally open relay contacts 1110CR in line 415 remains open. In the fifth stage, air gauge switch D5 is closed, and control relay 1111CR is energized. This in turn closes the normally open relay contacts 1111CR in line 419 and opens the normally closed relay contacts 1111CR in line 417.

Since the assumption is that the part is .009 larger than the minimum, but not oversize, air gauge switch D6 on line 408A will remain closed and control relay 1112CR will be energized. This in turn closes the normally open relay contact 1112CR in line 419 and opens the normally closed relay contact 1112CR in line 421. The circuit is now closed from line 410 through line 421. Starting with line 410, relay contact 1102TD2 closed one second after the energization of time delay 1102TD in line 405 and will remain closed for 1½ seconds. Relay contact 1107CR in line 411 is now closed along with relay contact 1108CR in line 413. Normally open relay contact 1109CR in line 415, normally closed relay contact 1110CR in line 417, normally open relay contact 1111CR in line 419 and normally open relay contact 1112CR in the same line are also closed. Relay contact 1107CR in line 410 is open, normally open relay contact 1108CR in line 411 remains open, normally closed relay contact 1109CR in line 413 is open, normally open relay contact 1110CR in line 415 remains open, normally closed relay contact 1111CR in line 417 opens and normally open relay contact 1112CR in line 419 closes, while normally closed relay contact 1112CR in line 421 opens. This therefore completes the circuit to energize latch control relay 1119CRL in line 419. When the latch control relay 1119CRL circuit is complete, an amber lamp, (not shown) located on a remote panel board is energized and so indicates the condition of the piston. In this particular instance the piston is indicated to be within limits of the predetermined gauge tolerance but .008 to .010 larger than the minimum permissible diameter.

When the latch control relay 1119CRL in the line 419 is energized, the normally open relay contact 1119CRL in line 35 is closed and solenoid S33 located in the scale mechanism is energized. This sets up the scale range for the piston now being gauged when it is moved to the scale station. The normally open relay contacts 1119CRL in lines 420 and 521 are also closed when latch control relay 1119CRL is energized. As relay contact 1119CRL in line 420 is closed and relay contact 1102TD3 closed, any previous setting of scale mechanism is unlatched. Time delay 1102TD3 opens 1½ seconds after time delay 1102TD has been energized and is open for a half second.

The normally open time delay relay contact 1102TD2 in line 410, when closed holds the latch control relay 1119CRL in line 419 energized. Before the latch control relay 1119CRL in line 419 is de-energized, the circuit through latch control relay 1121CRL in line 421A is completed and an amber indicating lamp on a remote panel (not shown) is energized. Energization of latch control relay 1121CRL in line 421A closes the normally open latch control relay contact 1121CRL in line 252 and opens the normally closed latch control relay contact 1121CRL in line 402. The relay timer contacts 1102TD1, 1102TD2, 1102TD3 having timed out, now open in sequence of the reverse manner described. Relay contact 1102TD3 opens, then relay contact 1102TD2 and relay contact 1102TD1, de-energizing their respective circuits. Then relay contact 1102TD4 is closed, latch control relay 1101CRL in line 402 is unlatched. This opens the normally open relay contact 1101CRL in line 25, de-energizing solenoid S23, and in turn closes the normally closed relay contacts 1101CRL in lines 26 and 251. When this occurs, solenoid S24 in line 26 is energized and hydraulic control valve K is activated. This causes the hydraulic cylinder piston L to retract and in turn opens limit switch 1101LS in line 405. When the hydraulic cylinder piston L reaches the limit of its rearward travel, the gauge is retracted and the limit switch 1102LS in line 250 closes. The opening of limit switch 1101LS in line 405 de-energizes multiflex timer 1102TD in the same line.

If the piston gauged is either under or over size, control relay 1114CR in line 410 or control relay 1120CR in line 421 will be energized. Energization of one of these control relays will close relay contact 1114CR in line 503 or relay contact 1120CR in line 501. Closing of these relay contacts will energize latch control relay 1127CRL or latch control relay 1128CRL, depending on the piston size, and one of two red indicating lamps on a remote panel (not shown) will be energized and will so indicate the piston to be undersize or oversize.

During this time, the circuit in line 238 is closed, and control relay 11CR is energized. When this occurs, the part is merely shuttled to the next work station in accordance with the shuttle motions previously described.

While the shuttle is forward and out the piston resting on scale platform is weighed and with the next movement the shuttle is then positioned back up and out.

*Scale Station*

After the piston which has been resting on the scale platform is weighed, and the shuttle bars positioned back out and down, the circuit in line 515 is closed and control relay 1201CR is energized. This closes relay contacts 1201CR in lines 516 and 517 and opens relay contact 1201CR in line 405. If the weight compensator cylinder X is out of adjustment for the piston now located at the gauge station, either limit switch 1203LS or limit switch 1204LS in lines 517 or 520 will be closed and solenoids S27 or S28 in lines 29 or 30 will be energized. The compensator cylinder X will then operate to move the scale lights forward or back. When the proper position of the scale lights has been reached (the position being the point at which both limit switches 1203LS in line 517 and limit switch 1204LS in line 520 are open) the gauged piston is shuttled to the scale station.

The piston is shuttled to the scale station in the manner described previously. The piston is engaged on the second shuttle movement, when the shuttle bars move in. During the shuttle cycle and when hydraulic valve O is activated, hydraulic cylinder piston G moves the shuttle bars out, releasing the gauged piston on the scale platform. With the shuttle forward, down and out, and relays 2CR, 4CR and 5CR energized and the respective relay contacts opened and closed, control relay 16CR in line 248 is closed, energizing solenoid S44 in line 46, repositioning hydraulic valve O. With the shuttle down control relay 13CR is de-energized with the opening of relay contact 2CR in line 241, while line 526 is energized. Latch control relay 1205CRL is unlatched in line 524 and the scale settle cylinder piston J moves down, allowing the last gauged piston to be weighed.

As the settle cylinder piston J moves down, limit switch 1202LS is closed and control relay 1207CR in line 528 is energized. Limit switch 1201LS in line 527 is opened and control relay 1206CR is de-energized. When control relay 1207CR in line 528 is energized, relay contacts 1207CR in lines 522, 524 and 534 closed and relay contacts 1207CR in lines 526 and 527 open. When the circuit in line 527 is broken and control relay 1206CR de-energized, relay contact 1206CR in line 528 closes and relay contact 1206CR in line 250 opens.

As relay contact 1207CR in line 522 is closed and the compensator cylinder X properly adjusted, control relay 1204CR in line 522 is energized, energizing control relay 1212CR (line 535A) through lines 533 and 534. The control relay 1212CR contacts in lines 515 and 605 open while relay contact 1212CR in line 545 closes to energize the light source for the photo-electric cells. The (2) relay contacts 1212CR in line 535 are then closed. The first control relay contact 1212CR is a holding contact around line 534, while the second control relay contact 1212CR energizes the time delay 1211TD timer. The instantaneous closing of contact 1211TD in line 533 closes to unlatch control relays 1209CRL and 1210CRL. When the scale platform has properly settled after deposition the gauged piston, the time delay contact on the timer 1211TD opens in line 533 and closes in line 531. If the piston is within the required weight range, both light sources for the the photo-electric cells will be exposed, energizing photo-electric cells PHR-1 and PHR-2. This in turn energizes latch control relay 1209CRL and latch control relay 1210CRL. The circuit in line 529 is closed and the time delay relay 1208TD then energizes the scale operation record latch control relay 1213CRL in line 536.

When latch control relay 1213CRL in line 536 is energized, relay contacts 1213CRL in lines 109, 252, 524 close, while relay contacts 1213CRL in lines 533, 526 and 605 open. This of course de-energizes line 533 and energizes latch control relay 1205CRL in line 525 to energize solenoid S25, to bring the settle cylinder piston J up to engage the bottom of the scale platform. In so doing, the time element is reduced to a minimum. Next the circuit in line 244 is closed and control relay 14CR is energized which in turn energizes solenoid S42 in line 44. Limit switch 1405LS in line 278 opens, deenergizing control relay 4CR as hydraulic cylinder piston F moves up, and upon reaching its maximum upward travel, limit switch 1406LS in line 277 is closed and control relay 3CR is energized. This sends the shuttle bars up to the original starting position of forward, up and out.

If the piston gauged is either dimensionally undersize or oversize, latch control relay 1114CRL in line 410 or control relay 1120CR in line 421 will be energized and the scale operation will not occur on this piston. Energization of control relay 1114CR will close relay contact 1114CR in line 503, while energization of control relay 1120CR in line 421 will close relay contact 1120CR in line 501. Closing of these relay contacts will energize latch control relay 1127CRL in line 501 or latch control relay 1128CRL in line 503, depending on the piston size. This in turn will energize one of two red indicating lamps on a remote panel (not shown) and so indicate the piston to be a reject which is either undersize or oversize. After these circuits have been activated the last gauged piston is then shuttled to the scale station and latch control 1125CRL is energized. This opens the normally closed relay contacts 1125CRL in lines 501 and 503 while closing the normally open relay contacts 1125CRL in lines 505, 602 and 607. Control relay 1132CR in line 510 is energized and relay contact 1132CR in line 509 is closed while relay contact 1132CR in line 538 opens. This in turn prevents unlatching of latch control relay 1213CRL in line 536 since the circuit in line 538 is broken, and when the scale circuit is broken the scale operation cycle is omitted. This occurs only when the piston diameter is outside the permissible limits. The piston is then shuttled to the selector station and rejected. A second shuttle record is made when latch control relay 1126CRL in line 431 is energized. Energization of latch control 1126CRL in line 431 opens relay contact 1126CRL in line 427, while it closes relay contacts 1126CRL in lines 429, 502, 603 and 606 and in turn unlatches latch control relays 1126CRL and 1127CRL.

If the piston is dimensionally oversize, control relay 1301CR in line 604 will be energized and relay contact 1301CR in line 36 will be closed, while relay contact 1301CR in line 405 and 605 will be opened. The closing of relay contact 1301CR in line 36 energizes solenoid S34, which in turn activates hydraulic valve V to reject the piston. This is accomplished through the control action of hydraulic cylinder piston P, by the action of hydraulic valve V.

If the piston is dimensionally undersize, control relay 1302CR in line 605 will be energized and relay contact 1302CR in line 37 will be closed, while relay contacts 1302CR in line 405 and 603 will be opened. As relay contact 1302CR in line 37 is closed, solenoid S35 in line 37 is energized. When hydraulic valve R is activated, hydraulic cylinder piston T rejects the part.

If the piston is dimensionally within the gauged size limits, but either underweight or overweight, the piston when weighed will bolck one of the two photo-electric cells. An overweight piston will block photo-electric cell PHR-2 while exposing photo-electric cell PHR-1 to the light source thus energizing the photo-electric cell PHR-1 which in turn energizes the overweight latch control relay 1209CRL in line 531. An underweight piston will block photo-electric cell PHR-1 while exposing photo-electric cell PHR-2 to the light source thus energizing the photo-electric cell PHR-2 which in turn energizes the underweight latch control relay 1210CRL in the line 532. When latch control relay 1209CRL is energized, relay contacts 1209CRL in lines 108 and 605 are opened while relay contacts 1209CRL in lines 529, 534 and 604 are closed. This closes the circuit for the photo-electric cell PHR-1.

When latch control relay 1210CRL is energized and the photo-electric cell PHR-2 circuit is closed, relay contacts 1201CRL in lines 109 and 604 open, while relay contacts 1210CRL in lines 530, 534 and 605 close.

*Selector Station*

The piston is then shuttled to the selector station in the same manner as previously described and control relay 1301CR in line 603, or control relay 1302CR in line 605 will be energized. Should control relay 1301CR in line 603 be energized, relay contacts 1301CR in line 36 will be closed and solenoid S34 will be energized. When solenoid S34 is energized hydraulic valve V is activated and causes hydraulic valve P to move forward, thus ejecting the overweight part from the selector. If control relay 1302CR in line 605 be energized, relay contact 1302CR in line 37 will be closed and solenoid S35 energized. When solenoid S35 is energized, hydraulic control valve R is activated and hydraulic cylinder piston T moves forward to eject thet underweight part in the opposite direction. When the ejector arm closes and the forward limit switch 1302LS in line 575, control relay 1303CR is energized and relay contacts 1303CR in lines 502, 505 and 533 are closed and either latch control relay 1209CRL in line 531 or latch control relay 1210CRL in line 532 will be unlatched and their respective circuits de-energized.

*Unloader Station*

When the shuttle bars are again activated, the gauged and weighed piston is positioned at the unload station.

With the shuttle bars positioned up and out the circuit in line 610 is closed and control relay 1401CR is energized. When control relay 1401CR is energized, relay contact 1401CR in line 38 is closed and solenoid S36 energized. Relay contact 1401CR in line 39 then opens. As the unloader moves in, limit switch 1402LS in line 616 opens de-energizing control relay 1404CR to break relay contact 1404CR in line 250, while closing relay contact 1404CR in line 614. This closes the circuit to lines 612 and 614 to energize the amber unloader record lamp, located on a remote panel (not shown). The circuit is then complete in line 614, since energization of latch control relay 1403CRL closes relay contacts 1403CRL in lines 252 and 614, and opens relay contact 1403CRL on line 610. When the unloader returns, solenoid S37 in line 39 is energized and relay contacts 1402CR in line 251 close, and relay contact 1402CR in line 610 opens thereby de-energizing solenoid S36. As the unloader reaches the limit of outward travel limit switch 1402LS in line 616 is again closed and control relay 1404CR energized. This opens relay contact 1404CR in line 614 and closes relay contact 1404CR in line 250.

Although the automatic cycle has been discussed quite thoroughly, it is possible to activate the work cycle by hand. To operate the machine, through a complete cycle by hand, pushbutton PB13 in line 110 is depressed. This breaks the circuit in line 110 and de-energizes control relay 100CR, opening the normally open relay contacts 100CR in lines 111, 238, 240, 242, 244, 246, 248, 403, 405, 524, 526, 610 and 613 while closing the normally closed relay contacts 100CR in lines 237, 239, 241, 243, 245, 247, 401, 523, 525, and 609. Thus, in order to operate the shuttle and bring it to the back position by the energization of control relay 11CR, it will be necessary to press pushbutton PB24 in line 237 since the circuit is broken at the normally open relay contact 100CR in line 238. When it is desired to bring the shuttle down, pushbutton PB25 in line 239 must be pressed since the circuit is broken in line 240 at relay contact 100CR. This will energize the control relay 12CR. To move the shuttle in, pushbutton PB26 is depressed to complete the circuit in line 242 to enerzige control relay 13CR. In order to bring the shuttle up pushbutton PB27 in line 243 is depressed and the circuit is complete through line 244 to energize control relay 14CR. To move the shuttle forward pushbutton PB28 in line 245 is depressed and the circuit is complete through control relay 15CR. To move the shuttle down, pushbutton PB25 in line 239 is closed which will energize control relay 12CR. Next, to bring the shuttle out, pushbutton PB29 in line 247 is closed which will energize control relay 16CR. To bring the shuttle up, pushbutton PB29 in line 247 is closed and the circuit is complete to line 248 to energize control relay 16CR.

To move the gauge in, pushbutton PB42 in line 401 is depressed and the circuit is complete through line 401 to line 402 and the latch control relay 1101CRL in line 402 is energized to send the gauge in. When it is desired to bring the gauge out, pushbutton PB43 in line 402A is depressed and the circuit is complete through line 403 to unlatch control relay 1101CRL and bring the gauge out. With the gauge forward, the limit switch 1101LS in line 405 closed, the circuit is complete to energize the multiflex timer 1102TD in line 405 since pushbutton PB44 in line 404 is closed.

When it is desired to move the settle cylinder piston J down, pushbutton PB46 in line 525 is closed and the circuit is complete in line 526 to unlatch latch control relay 1205CRL in line 524 and move cylinder piston J down. To move settle cylinder piston J up, pushbutton PB45 in line 523 is depressed and the circuit in line 524 is closed to energize latch control relay 1205CRL in the same line and bring the cylinder up.

When it is desirable to check the photo-electric cell light source, PB49 is depressed to close contact 97PHCR in line 544. PB47 is then energized to light lights L1 and L2 which allows the scale platform to be moved manually so as to check the over and under weight limits. If the lights in line 540 and 541 go on and off as the scale platform is moved up and down, the indication would be that the photocell units 1PHR and 2PHR below line 545 are in working condition. To extinguish the lights after testing, pushbutton PB48 is closed breaking the circuit in line 542. Control relay 97PHCR will be de-energized at this time and normally open contacts 97PHCR on lines 543 and 544 will open.

The selector station will operate automatically although the unloader station must be activated by hand. The unloader is actuated by depressing pushbutton PB50 in line 509 which will close the circuit in line 510 and energize control relay 1401CR and de-energize control relay 1402CR in line 612. The remaining portion of the cycle is carried out in the same manner as is the automatic cycle previously described.

Referring to FIGS. 8 through 17 of the drawings, the mechanism comprises a base member 200 on which is mounted a movable shuttle mechanism, an air gauge mechanism and scales. The scales have affixed thereto, a compensator mechanism which works in conjunction therewith, to adjust the scale range for the piston being weighed. The piston or other workpiece is successively advanced or indexed by the shuttle mechanism to the various work stations spaced along the length of the machine, the several operations being synchronized by the electrical and mechanical control system previously described and illustrated in FIGURES 1 through 7. The shuttle mechanism comprises a pair of parallel, transversely spaced horizontal rails or shuttle bars B20 and B22, which may be positioned as shown in dotted lines on FIGURE 11, the DO position being down and out, the DI position being down and in, the UI position being up and in, while UO position is up and out.

A number of grippers, or work engaging members are positioned longitudinally along the rails in spaced relationship, corresponding to the work stations. Each gripper is comprised of two pair of spaced nylon fingers which engage the piston tangentially upon inward movement of the shuttle bars. As would be expected, the grippers are in pairs and so positioned as to be opposite each other and will engage the piston securely.

The fingers of the grippers may be made of any suitable wear-resistant and non-abrasive material that will provide a good firm frictional grip, without damaging the piston or other workpiece.

When the sequence of the shuttle bars reaches the forward, up and out position, as described in the drawings (FIGURES 1-7), the air gauge assembly illustrated in FIGURES 8 and 9, is activated, and moves in to gauge the piston or other workpiece. When the gauge on shaft L reaches the limit of inward travel, limit switch 1101LS is closed by the adjustable stop 201, which is secured to the flag member 202.

On the return of hydraulic cylinder piston L, limit switch 1102LS on the opposite end of the mounting pad is closed by the adjustable stop 203, carried on flag 202. The limit switches 1101LS and 1102LS are mounted on the gauge base member 204, with the gauge base secured to the machine base 200. The gauge proper is horizontally mounted and is of generally U shape. A permanent anvil 206 is secured to one face of the U shape, while adjacent thereto is mounted a movable, spring loaded pivotal finger member 208, which acts to align the piston or other workpiece and limit the flow of air through line 209, so as to settle the air gauge before a gauge reading is made. Adjustable stops 208A and 208B (FIGURE 8) are provided to limit the travel of the finger 208. After the air gauge has had adequate time to settle, the pivotal finger member 208 continues to hold open air line 209, so as to activate a series of three commercially produced air gauges. Each air gauge has a diaphragm and bellows, along with a normally open contact and a normally closed contact. These contacts are activated in accordance with the air passage through line 209.

In FIGURES 10–12, the scale mechanism is illustrated. In FIGURE 10, which shows the front view of the scales, it should be noted that the scale housing 218 is made up of three sections for ease of manufacture and assembly. A commercially manufactured no-springs scales is fitted into the housing modified slightly to accomplish the desired results.

A special pointer 211 is secured to the scale balance and has an opaque, arcuate symmetrical section 222 interposed between two light sources 224 and two photo electric cells PHR1 and PHR2. Since the piston may be either within the tolerance range, underweight or overweight, two photo-cells PHR1 and PHR2 are used. When the piston on the scales is weighed, each of the two photo-cells is exposed to both light sources; however, if the piston is either underweight or overweight, one of the photo-cells will have its light source closed off by the movement of the arcuate opaque section of the pointer. This will cause the circuit selected to be energized, which will reject the piston at the next successive station. The light sources 224 are focused on the photo-electric cells PHR1 and PHR2 by means of a lens member 225, positioned inside the stationary part of the scale housing.

When a piston is deposited on fixture 210, which is mounted on the scale platform 212, is found to be oversize during the gauge operation, but within the acceptable tolerance, one of the solenoids S29 through S33 in the scale compensator (FIGURES 13–15) is energized. This establishes the weight range (for the gauged size) into which the piston must fall. When the solenoid energization occurs, one of the pivotal arms 223 through 227 will pivot about pin 214 or 215 carried on a bracket 217 mounted on the compensator frame member 221. When either of the pivotal arms 223 through 227 move, one of a series of generally flat stop plates 002, 004, 006, 008 or 010, slides between the vertical flanges of bearing slide boxes 219 and 220. As one of the solenoids is energized, the solenoid core shaft which is mounted to the outer end 231 of the pivotal arm will move up, causing the outside end of the pivotal arm to move up, while the inner end 228 thereof moves down. The inner end 228 of the pivotal arm has a tongue portion 230 which engages a notch 232 in the upper end of the neck portion 234 of stop plates 002, 004, 006, 008, 010 and thereby transmits any motion of the pivotal arms to the positioning stop plates. When any one of the stop plates 002, 004, 006, 008 or 010 is caused to be moved down by the action of the pivotal arms, the lower corners Y and Z of the stop plates engage rollers 330 and 332 of the crank arms H and I in the compensator. Crank arms H and I are pivoted on pins 285 and 287 and when moved will close one of the normally open limit switches 1203LS or 1204LS, thereby activating hydraulic cylinder piston X. This piston movement will occur only if successive pistons are of different size. When either of the limit switches 1203LS or 1204LS is closed and solenoid S27 or S28 is energized, hydraulic cylinder piston X moves forward or back as the case may be until the limit switch actuated is again opened.

Movement of piston X carries the entire crank arm carriage assembly 290, and is slidably mounted in the compensator frame 221. The carriage assembly 290 is guided in a channel 292 provided in the compensator frame 221, and the limits of the carriage assembly travel is determined by the position of the threaded nuts 294 on shaft 296, extending from the carriage assembly 290.

Extending from the rear of the carriage assembly 290 is a pin 300 (FIGURE 15), to which is affixed an adjustable linkage arm 302. At the right end of the linkage arm and identified by the numeral 306 is a horizontally mounted pin 308. Pin 308 extends through the lower end 312 of the pivotal bar 310 and is keyed to a horizontal shaft 320 in the scale mechanism (FIGURE 11). At the right end of the shaft 320 is keyed a second arm which carries the light source 224 for energizing the photoelectric cells. Thus it is now apparent that when both limit switches 1203LS and 1204LS in the compensator are open and the compensator properly adjusted by the action of hydraulic cylinder piston X, the resulting action will increase or decrease the permissible weight of the piston in accordance with the previously gauged diameter.

As the piston is deposited on the scale platform 212, tongue member 322, which extends forward from the platform, is positioned between the adjustable stop member 324 and the end 326 of settle cylinder piston J (FIGURES 11 and 16), so that when solenoid S25 is energized and hydraulic cylinder piston J moves down, the scale platform will move down at the same uniform rate and thus eliminate an unnecessary time delay to permit the scale to come to a complete rest. If the settle cylinder piston J were eliminated, the scale platform would "bounce" each time a piston was deposited and an unreasonable amount of time would be required for each weighing operation. To obtain maximum accuracy, the scale must come to rest after each piston is deposited. As the settle cylinder piston J reaches the limit of its downward travel, limit switch 1202LS will be closed and limit switch 1201LS will open. After the piston is weighed and the end of the settle cylinder piston J moves up to hold the scale platform bracket 322 in position, limit switch 1201LS closes and limit switch 1202LS opens.

At this time, the piston is shuttled to the selector station where it is automatically accepted or rejected as previously described.

Having gone through a complete work cycle, the finished piston is then shuttled to the unload station and the machine is ready for another successive cycle.

From the foregoing description, it will be readily apparent that the present invention provides an improved method for the manufacture of precision automobile pistons. The improved method comprises the steps of gauging, weighing, and selecting automobile pistons in several successive steps, either singly or in combination. The system controls very accurately the dimensional size and weight tolerance of each piston fabricated within very close limits, as well as providing an expeditious and efficient method of automated manufacture.

Having thus described my invention, I claim:

1. In a device for coordinating measuring operations relative to a cylindrical workpiece, the combination of, shuttle means movably mounted on a machine frame and adapted to extend longitudinally in spaced relationship along a row of spaced work stations; gripping means on said shuttle means at each of the several work stations; shuttle actuating and control means; said shuttle actuating and control means cooperable to advance said workpiece from a gauge station to a weighing station; a scales located at said weighing station; an adjustable scale compensator affixed to said scales; and means for adjusting said scale compensator in accordance with the permissible weight limits for a given gauged dimension.

2. A measuring device in accordance with claim 1, wherein the program for the scale compensator is automatically established at the gauge station, the control means for actuating and adjusting said scale compensator comprises an adjustable linkage arm connecting said scale compensator to a linkage arm extending from said scales; means controlling the movement of said linkage arm in accordance with the gauged dimension.

3. A measuring device in accordance with claim 1, wherein the program for the scale compensator is automatically established at the gauge station; the control means for actuating and adjusting said scale compensator comprising an adjustable linkage connecting said scale compensator to a linkage arm extending from said scales;

and including a slidably mounted carriage in said scale compensator; an adjustable linkage arm connected to said carriage and to said scale arm; and means for controlling and limiting the movement of said carriage.

4. A measuring device in accordance with claim 1, wherein the program for the scale compensator is automatically established at a gauge station; the control means for actuating and adjusting the scale compensator comprises mechanical means located at the gauge station, which actuate mechanical means to move one of a plurality of pivotal linkages in the scale compensator; a plurality of slidably mounted stop plates in said compensator; movement of one of said pivotal linkages causes movement of one of said stop plates slidably mounted in a guide member and pivotally secured to said linkage; said stop plate actuates mechanical means to adjust the position of said slidably mounted carriage in the compensator; and an adjustable linkage to connect said scale compensator to a linkage arm extending from said scales.

5. In a device for coordinating measuring operations relative to a cylindrical workpiece, the combination of a shuttle means movably mounted on a machine frame and adapted to extend longitudinally along a row of work stations; gripping means on said shuttle means at each of the several work stations; shuttle actuating means; a first control means for said shuttle actuating means; said shuttle actuating means and said first control means cooperable to advance the workpiece from a gauge station to a scale weighing station; an adjustable scale compensator affixed to said scales; the scale compensator program being established at the gauge station; control means for actuating said scale compensator located at said gauge station which actuates mechanical means to move one of a plurality of pivotal linkages in the scale compensator; a plurality of slidably mounted stop plates in said compensator; movement of one of said pivotal linkages causes movement of a stop plate which is slidably mounted in a guide block; said stop plate and said pivotal linkage pivotally joined; said stop plate actuates mechanical means to adjust position of said slidably mounted carriage in the scale compensator; an adjustable linkage connecting said scale compensator carriage to a pivotal arm extending from said scales; said scale linkage arm carries a second arm secured to a fixed pivot bearing in the scale housing; a pair of lights in spaced relationship on said second arm; said lights positioned to be focused on a pair of photo electric cells; and means located in said scale mechanism to actuate said photo electric cells, should the workpiece be undersize or oversize in accordance with the gauged diameter.

6. A measuring device in accordance with claim 5, wherein the means for activating the photo electric cells is interposed between the light source and the photo electric cells, and is carried by the scale pointer.

7. A measuring device in accordance with claim 5, wherein the means for activating the photo-electric cells is interposed between the light source and the photo cells, and is carried by the scale pointer; and includes a lens interposed between said pointer and said photo cells to focus said light source on said photo cells.

8. A measuring device in accordance with claim 5, wherein a single scale mechanism will operate over a wide range by movement of said scale arm which carries the photo electric cell light source, the tolerance limits for acceptance or rejection of said workpiece remaining constant and in accord with predetermined weight limits previously established at the gauge station.

9. A measuring device in accordance with claim 5, wherein the acceptable tolerance range may be increased or decreased by increasing or decreasing the spaced relationship of the photo electric light source carried on the movable scale arm.

10. A measuring device in accordance with claim 5, wherein the acceptable tolerance range may be increased or decreased by increasing or decreasing the spaced relationship between the photo electric cells and the activating means which is mounted on the scale pointer interposed between the light source and the photo electric cells.

11. In a device for coordinating measuring operations relative to a workpiece, the combination of, a shuttle means movably mounted on a machine frame and adapted to extend along a row of work stations in parallel spaced relationship; work engaging means on said shuttle means at each of the several work stations; shuttle actuating and control means; said shuttle actuating and control means cooperable to advance a workpiece from a gauge station to a scale weighing station; an adjustable scale compensator affixed to said scale; the scale compensator program being established at the gauge station; weight control means for actuating the scale compensator located at said gauge station; said weight control means actuate mechanical means to move one of a plurality of pivotal linkages in the scale compensator; a plurality of slidably mounted stop plates in said compensator; movement of one of said pivotal linkages causes movement of a slidably mounted stop plate in a guide block; said slidably mounted stop plate and said pivotal linkage pivotally joined; a pair of crank arms pivotally mounted on a slidable carriage in said compensator; said crank arms activated by said movable stop plate; compensator control means to position said compensator carriage; an adjustable linkage to connect said movable compensator carriage and said scale arm; said scale arm carries a second pivotal arm; said second arm mounted on a fixed pivot in the scale housing; a pair of light sources in spaced relationship on said second arm; said light sources positioned so as to be focused on a pair of photo electric cells; and means for activating said photo electric cells interposed on the scale pointer, between the light source and the photo electric cells.

12. In a device for coordinating measuring operations automatically, relative to workpieces located along a row of work stations; a pair of shuttle bars movably mounted on a machine frame; a number of pairs of workpiece engaging means positioned adjacent each other on said shuttle bars, at each of the work stations; shuttle actuating means for actuating said shuttle means laterally, vertically and longitudinally; a first control means for actuating said shuttle means; said shuttle actuating means and said first control means cooperable to advance a workpiece to a gauge station where it is gauged automatically; a second control means cooperable with said first shuttle control and actuating means operating said gauge means; said shuttle control and actuating means cooperable to advance said workpiece from the gauge station to a scale weighing station; a third control means to weigh said workpiece in accordance with the gauged diameter; said shuttle actuating means and said first control means cooperable to advance said workpiece from said weighing station to a selector station; a fourth control means cooperable with said first, second and third control means and other actuating means to select said workpiece in accordance with the gauged size and weight; and a fifth control means cooperable with said first, second, third and fourth control means and other actuating means to unload said workpiece at a work station at the end of the work cycle.

13. In a device for coordinating measuring operations relative to a workpiece, such as an automobile piston, the combination of, shuttle means operatively positioned on a machine frame and adapted to extend horizontally and in spaced relationship along a row of uniformly spaced work stations; workpiece gripping means positioned on said shuttle means adjacent each of the several work stations; shuttle actuating and control means; said shuttle actuating and control means cooperable to advance said workpiece to a work station where the workpiece is automatically gauged, said gauge having a slidably mounted U shaped member with two spaced arms; means for limiting movement of said slidably mounted member; a fixed anvil on one arm of said U shaped member; a movable finger member pivotally secured to the other arm thereof adjacent the fixed anvil; a pair of adjustable stops on said arm to limit the travel of said finger member; a spring between said movable finger and said U shaped member; an air gauge cooperable with said movable finger to gauge the diameter of the workpiece positioned between said fixed anvil and said movable finger, said finger actuating a compensating means for determining the weight of said gauged workpiece within pre-determined limits; and gauge control means cooperable with said shuttle actuating and control means to operate said gauge means in timed sequence.

References Cited in the file of this patent

UNITED STATES PATENTS

| | | |
|---|---|---|
| 1,807,825 | Boyer | June 2, 1931 |
| 1,873,315 | Dreyer | Aug. 23, 1932 |

FOREIGN PATENTS

| | | |
|---|---|---|
| 873,748 | Germany | Apr. 16, 1953 |